(12) United States Patent
Takahata (10) Patent No.: US 9,917,296 B2
(45) Date of Patent: Mar. 13, 2018

(54) NONAQUEOUS ELECTROLYTE SECONDARY BATTERY

(71) Applicant: TOYOTA JIDOSHA KABUSHIKI KAISHA, Toyota-shi, Aichi-ken (JP)

(72) Inventor: Koji Takahata, Nissin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 12 days.

(21) Appl. No.: 15/300,398

(22) PCT Filed: Apr. 1, 2015

(86) PCT No.: PCT/IB2015/000430
§ 371 (c)(1),
(2) Date: Sep. 29, 2016

(87) PCT Pub. No.: WO2015/150901
PCT Pub. Date: Oct. 8, 2015

(65) Prior Publication Data
US 2017/0149048 A1    May 25, 2017

(30) Foreign Application Priority Data
Apr. 2, 2014    (JP) ................. 2014-076355

(51) Int. Cl.
*H01M 4/00*    (2006.01)
*H01M 4/13*    (2010.01)
*H01M 10/0525*    (2010.01)
*H01M 4/02*    (2006.01)
*H01M 10/42*    (2006.01)

(52) U.S. Cl.
CPC ......... *H01M 4/13* (2013.01); *H01M 10/0525* (2013.01); *H01M 2004/021* (2013.01); *H01M 2010/4292* (2013.01)

(58) Field of Classification Search
CPC ...................................................... H01M 4/00
See application file for complete search history.

(56) References Cited

FOREIGN PATENT DOCUMENTS

JP    2007-207535    *  8/2007
JP    2007-207535 A    8/2007

* cited by examiner

*Primary Examiner* — Jacob Marks
(74) *Attorney, Agent, or Firm* — Oliff PLC (57) ABSTRACT

A nonaqueous electrolyte secondary battery includes: a positive electrode that includes a positive electrode active material layer; a negative electrode that includes a negative electrode active material layer; and a nonaqueous electrolytic solution. When a void volume of the positive electrode active material layer per battery capacity is represented by α (cm³/Ah), and when a void volume of the negative electrode active material layer per battery capacity is represented by β (cm³/Ah), the following conditions are satisfied:

$1.00 \leq \alpha \leq 2.20;$ (1)

$2.17 \leq \beta \leq 3.27;$ and (2)

$\alpha < \alpha.$ (3)

6 Claims, 2 Drawing Sheets

NONAQUEOUS ELECTROLYTE SECONDARY BATTERY

BACKGROUND OF THE INVENTION

1. Field of the Invention

The present invention relates to a nonaqueous electrolyte secondary battery. More specifically, the invention relates to a nonaqueous electrolyte secondary battery in which a void volume of an active material layer per battery capacity is adjusted.

2. Description of Related Art

A nonaqueous electrolyte secondary battery such as a lithium ion secondary battery has a lighter weight and higher energy density than those of existing batteries. Therefore, the nonaqueous electrolyte secondary battery is suitably used as a driving power supply used for a vehicle such as an electric vehicle or a hybrid vehicle or as a so-called portable power supply used for a personal computer, a portable device, or the like.

In such a typical configuration of the nonaqueous electrolyte secondary battery, a positive electrode and a negative electrode include active material layers containing, as a major component, materials (active materials) that can reversibly store and release charge carriers. Voids are formed in the active material layers. The battery is charged and discharged by the charge carriers moving between the active materials of the positive and negative electrodes through a nonaqueous electrolytic solution impregnated into the voids. Accordingly, the amount and properties (for example, a pore size) of the voids in the active material layers have significant effects on battery characteristics. For example, Japanese Patent Application Publication No. 2007-207535 (JP 2007-207535 A) describes that, by increasing a porosity (VC) of a positive electrode active material layer to be higher than a porosity (VA) of a negative electrode active material layer, the movement of charge carriers is well-balanced between positive and negative electrodes, and superior output performance can be obtained.

In some cases, a nonaqueous electrolyte secondary battery is used while repeating rapid charging and discharging in which a high current instantaneously flows at a high rate of, for example, 2 C (particularly, 5 C) or higher. In this case, the battery is used as a vehicle-mounted power supply with high output. In the battery, a load which is applied to an active material layer along with the movement of charge carriers is higher than that of, for example, the battery described in JP 2007-207535 A. Specifically, when the battery is continuously charged and discharged at a high rate, an excess amount of nonaqueous electrolytic solution may be extruded from an active material layer due to, for example, an effect of a pumping action working along with the expansion and contraction of an active material. Accordingly, the density of charge carriers in the nonaqueous electrolytic solution may be non-uniform, or charge carriers may be concentrated on one electrode side. As a result, a load applied along with the movement of the charge carriers increases, and thus an internal resistance may increase.

SUMMARY OF THE INVENTION

The invention has been made to provide a nonaqueous electrolyte secondary battery in which high-rate cycle characteristics are superior by preventing non-uniformity in density and concentration of charge carriers.

As a result of studies from various points of view, the present inventors have found that the volume of voids (spaces into which a nonaqueous electrolytic solution is impregnated) suitable for high-rate charging and discharging is present for each of active material layers of positive and negative electrodes, and when the void volume is different from a suitable void volume, an internal resistance increases. As a result of further studies based on the above findings, the present inventors have completed the invention.

According to an aspect of the invention, there is provided a nonaqueous electrolyte secondary battery including: a positive electrode that includes a positive electrode active material layer; a negative electrode that includes a negative electrode active material layer; and a nonaqueous electrolytic solution. When a void volume of the positive electrode active material layer per battery capacity is represented by $\alpha$ ($cm^3$/Ah), and when a void volume of the negative electrode active material layer per battery capacity is represented by $\beta$ ($cm^3$/Ah), the following conditions are satisfied:

$$1.00 \le \alpha \le 2.20; \quad (1)$$

$$2.17 \le \beta \le 3.27; \text{ and} \quad (2)$$

$$\alpha < \beta. \quad (3)$$

By satisfying the above-described conditions, the above-described non-uniformity in density and concentration of charge carriers can be prevented while securing a necessary minimum amount of nonaqueous electrolytic solution in the active material layer. That is, the charge transfer resistance can be reduced by appropriately securing the diffusion path of charge carriers in the active material layer. In addition, an appropriate amount of nonaqueous electrolytic solution can be suitably maintained in each of the active material layers of the positive and negative electrodes by reducing the effect of the pumping action. As a result, the initial resistance is low, and an increase in the internal resistance is also small even after repetition of high-rate charging and discharging. Therefore, a nonaqueous electrolyte secondary battery having superior high-rate cycle characteristics can be provided.

In this specification, "void volume" refers to a value measured using a commonly-used mercury porosimeter. Specifically, first, a positive electrode active material layer and a negative electrode active material layer separated from a battery are dipped and washed in an appropriate solvent (for example, EMC) and then are cut into a measurement sample having a predetermined size. Next, the measurement sample is dipped in mercury in a state of being vacuumed, and a pressure applied to mercury is increased in this state. As a result, mercury is slowly impregnated into small spaces (pores). Therefore, based on a relationship between the pressure applied to mercury and the amount of mercury impregnated, distributions of the size of voids (pore size) and the volume thereof (pore volume) in the measurement sample (a positive electrode active material layer or a negative electrode active material layer) can be measured. For example, when a mercury porosimeter "Autopore III 9410" (manufactured by Shimadzu Corporation) is used, the pressure is measured in a pressure range of 4 psi to 60000 psi. As a result, the volume distribution of voids corresponding to a pore size range of 50 μm to 0.003 μm can be determined. The sum of pore volumes (total pore volume ($cm^3$)) obtained by the above measurement can be considered "void volume".

In the aspect of the invention, the void volume $\alpha$ may be 1.15 or more. By adjusting the void volume $\alpha$ to be within the above-described range, an increase in the internal resistance after high-rate charging and discharging can be further reduced. Accordingly, the effects of the invention can be exhibited at a higher level. In the aspect of the invention, the void volume α may be 1.30 or more.

In the aspect of the invention, a ratio α/β of the void volume α to the void volume β may be at least 0.35 and at most 0.88. By adjusting the ratio α/β to be within the above-described range, an increase in the internal resistance after high-rate charging and discharging can be further reduced. Accordingly, the effects of the invention can be exhibited at a higher level. In addition, in the aspect of the invention, the ratio α/β of the void volume α to the void volume β may be at least 0.52 and at most 0.71.

In the aspect of the invention, an average pore size of the positive electrode active material layer may be 0.25 μm to 0.55 μm. When high-rate charging and discharging is repeated, the diffusion rate of charge carriers in the positive electrode active material layer during discharging can be controlled. By adjusting the average pore size of the positive electrode active material layer to be within the above-described range, the charge carriers move in and out from the positive electrode active material layer. Therefore, the charge transfer resistance can be further reduced. Accordingly, the effects of the invention can be exhibited at a higher level. In this specification, as in the case of the void volume of the active material layer, "average pore size" refers to a value measured using a commonly-used mercury porosimeter.

As described above, in the nonaqueous electrolyte secondary battery (for example, a lithium ion secondary battery) disclosed herein, the initial resistance is low, and an increase in the internal resistance is also small even after repetition of high-rate charging and discharging. Therefore, not only high rate characteristics but also high-rate cycle characteristics are superior. Accordingly, due to the superior characteristics, the nonaqueous electrolyte secondary battery can be suitably used as, for example, a power source (driving power supply) for driving a vehicle-mounted motor.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Preferred embodiments of the present invention are described below. Matters (for example, other components and a common manufacturing process of a battery which are not characteristics of the invention) necessary to practice this invention other than those (for example, configurations of positive and negative electrodes) specifically refereed to in this description may be understood as design matters based on the conventional art in the pertinent field for a person of ordinary skills in the art. The invention can be practiced based on the contents disclosed in this description and common technical knowledge in the subject field.

A nonaqueous electrolyte secondary battery according to an embodiment of the invention includes: a positive electrode that includes a positive electrode active material layer; a negative electrode that includes a negative electrode active material layer; and a nonaqueous electrolytic solution. A void volume of each of the positive electrode active material layer and the negative electrode active material layer per battery capacity is adjusted to be within a predetermined range. Accordingly, other components are not particularly limited. Hereinafter, the respective components will be sequentially described.

<Positive Electrode>

The positive electrode of the nonaqueous electrolyte secondary battery disclosed herein has, typically, a configuration in which a positive electrode active material layer is attached onto a positive electrode current collector. As the positive electrode current collector, a conductive member formed of highly conductive metal (for example, aluminum, nickel, or titanium) is preferably used.

The positive electrode active material layer includes at least a positive electrode active material. As the positive electrode active material, various known materials which can be used as a positive electrode active material of a nonaqueous electrolyte secondary battery can be considered. Preferable examples of the positive electrode active material include layered or spinel type lithium transition metal composite oxide materials (for example, $LiNiO_2$, $LiCoO_2$, $LiMn_2O_4$, $LiFeO_2$, $LiNi_{0.33}Co_{0.33}Mn_{0.33}O_2$, $LiNi_{0.5}Mn_{1.5}O_4$, and $LiCrMnO_4$) and olivine type materials (for example, $LiFePO_4$). Among these, a lithium nickel cobalt manganese composite oxide having a layered structure which contains Li, Ni, Co, and Mn as constituent elements is preferably used from the viewpoints of heat stability and energy density. The form of the positive electrode active material is not particularly limited but, typically, is a particulate or powder form. The average particle size of the positive electrode active material in a particulate form is 20 μm or less (typically, 1 μm to 20 μm; for example, 5 μm to 15 μm) when measured based on a laser diffraction and scattering method. As a result, a positive electrode active material layer having the void volume disclosed herein can be suitably formed.

In addition to the positive electrode active material, the positive electrode active material layer further contains one material or two or more materials which can be used as components of a positive electrode active material layer in a general nonaqueous electrolyte secondary battery. Examples of the material include a conductive material and a binder. As the conductive material, for example, carbon materials such as various carbon blacks (for example, acetylene black and Ketjen black), activated carbon, graphite, and carbon fiber are preferably used. In addition, as the binder, for example, vinyl halide resins such as polyvinylidene fluoride (PVdF) or polyalkylene oxides such as polyethylene oxide (PEO) are preferably used. In addition, the positive electrode active material layer may further contain various additives (for example, a gas forming agent, a dispersant, and a thickener).

A ratio of the mass of the positive electrode active material to the total mass of the positive electrode active material layer is suitably about 60 mass % or more (typically, 60 mass % to 99 mass %) and is usually preferably about 70 mass % to 95 mass %. As a result, high energy density can be realized. When the conductive material is used, a ratio of the mass of the conductive material to the total mass of the positive electrode active material layer is, for example, about 2 mass % to 20 mass % and is usually preferably about 3 mass % to 10 mass %. As a result, the electron conductivity in the positive electrode active material layer can be further improved, and higher high-rate cycle characteristics can be realized. When the binder is used, a ratio of the mass of the binder to the total mass of the positive electrode active material layer is, for example, about 0.5 mass % to 10 mass % and is usually preferably about 1 mass % to 5 mass %. As a result, the mechanical strength (shape retaining ability) of the positive electrode active material layer can be suitably secured, and superior durability can be realized.

In the technique disclosed herein, a void volume $\alpha$ (cm$^3$/Ah) of the positive electrode active material layer per battery capacity is 1.00 or more and preferably 1.15 or more. For example, the void volume $\alpha$ may be 1.30 or more. In addition, the void volume $\alpha$ (cm$^3$/Ah) of the positive electrode active material layer per battery capacity is 2.20 or less. For example, the void volume $\alpha$ may be 1.90 or less or may be 1.60 or less. By satisfying 1.00≤$\alpha$ (preferably 1.15≤$\alpha$), the diffusion path of charge carriers in the positive electrode active material layer can be secured, and the charge transfer resistance can be effectively reduced. In addition, by satisfying $\alpha$≤2.20, the amount of the nonaqueous electrolytic solution in the positive electrode active material layer can be suitably maintained even when high-rate charging and discharging is repeated at 2 C (particularly, 5 C) or higher. Further, suitable electron conductivity can be imparted to the positive electrode active material layer. As a result, superior high rate characteristics and high-rate cycle characteristics can be realized.

As long as the void volume $\alpha$ is satisfied, the density of the positive electrode active material layer is not particularly limited but is usually 1 g/cm$^3$ or more (typically 1.5 g/cm$^3$ or more, for example; 1.7 g/cm$^3$ or more and preferably 1.8 g/cm$^3$ or more) and 4 g/cm$^3$ or less (typically 3.5 g/cm$^3$ or less; for example, 3 g/cm$^3$ or less and preferably 2.5 g/cm$^3$ or less). By satisfying the above-range, high battery capacity can be secured, and an appropriate amount of voids can be secured in the positive electrode active material layer. Therefore, high energy density and high input and output densities can be simultaneously realized at a high level. In this specification, "the density of the positive electrode active material layer" refers to a value obtained by dividing the mass of the active material layer (g) by the apparent volume (cm$^3$) of the active material layer. The apparent volume can be calculated as a product of the area (cm$^2$) in a plan view and the thickness (cm). Specifically, first, the active material layer is cut into a square shape or a rectangular shape using a punch or a cutter. Next, the area (cm$^2$) in a plan view and the thickness (cm) of the active material layer of the cut sample are measured, and these values are multiplied so as to calculate the apparent volume. The thickness can be measured using, for example, a micrometer or a thickness meter (for example, a rotary caliper meter).

In addition, the average thickness of the positive electrode active material layer per single surface is not particularly limited, but is usually 30 μm or more (typically, 40 μm or more, preferably 50 μm or more, and more preferably 60 μm or more) and 100 μm or less (typically, 90 μm or less, preferably 80 μm or less, and more preferably 70 μm or less). By forming the positive electrode active material layer to be relatively thicker, the energy density of the battery can be improved. In general, when the thickness of a positive electrode active material layer is large, the diffusion distance of charge carriers increases, and the internal resistance (particularly, the resistance during high-rate charging and discharging) of the positive electrode active material layer increases in contrast. However, according to the technique disclosed herein, the diffusion path of charge carriers in the positive electrode active material layer can be accurately secured. Therefore, high energy density and high input and output densities can be simultaneously realized at a high level. That is, examples of preferable targets to which the technique disclosed here is applicable include a nonaqueous electrolyte secondary battery in which the thickness of a positive electrode active material layer is large (for example, 60 μm or more, specifically, 60 μm to 80 μm).

The average pore size of the positive electrode active material layer is not particularly limited but is usually 0.1 μm or more (preferably 0.2 μm or more and more preferably 0.25 μm or more; for example, 0.3 μm or more). The pores of the active material layer are so-called inlet and outlet ports from which charge carriers move in and out. When the average pore size is 0.2 μm or more (for example, 0.25 μm or more), even charge carriers which are solvated by solvent molecules can smoothly move in and out from the inside of the active material layer. Therefore, even when high-rate charging and discharging is repeated, it is difficult to increase the charge transfer resistance in the positive electrode active material layer. In addition, the upper limit of the average pore size is usually 0.8 μm or less (preferably 0.6 μm or less and more preferably 0.55 μm or less; for example, 0.5 μm or less). When the average pore size is 0.6 μm or less (for example, 0.55 μm or less), the moving speed of charge carriers in the voids increases, and the reactivity can be improved. Accordingly, higher high-rate cycle characteristics can be realized.

Such a positive electrode can be suitably manufactured, for example, in the following procedure. That is, first, the positive electrode active material and other arbitrary components (for example, a binder or a conductive material) are dispersed in an appropriate solvent to prepare a slurry composition. Next, a positive electrode current collector is coated with the composition and is dried to remove the solvent. Next, in a preferred embodiment, the dried positive electrode active material layer is pressed. Here, the void volume of the positive electrode active material layer per battery capacity can be adjusted by controlling, for example, properties (for example, a solid content ratio) of the slurry composition, a coating thickness, and press conditions (for example, a press pressure and a press time). As a result, a positive electrode in which a positive electrode active material layer having desired properties is formed on a positive electrode current collector can be manufactured.

<Negative Electrode>

The negative electrode of the nonaqueous electrolyte secondary battery disclosed herein has, typically, a configuration in which a negative electrode active material layer is attached onto a negative electrode current collector. Such a negative electrode can be suitably manufactured, for example, in the same procedure as that of the positive electrode. As the negative electrode current collector, a conductive member formed of highly conductive metal (for example, copper, nickel, titanium, or stainless steel) is preferably used.

The negative electrode active material layer includes at least a negative electrode active material. As the negative electrode active material, various known materials which can be used as a negative electrode active material of a nonaqueous electrolyte secondary battery can be considered. Preferable examples of the negative electrode active material include various carbon materials such as graphite, non-graphitizable carbon (hard carbon), graphitizable carbon (soft carbon), carbon nanotube, and a carbon material having a combination thereof (for example, amorphous coated graphite). Among these, from the viewpoint of energy density, graphite-based materials such as natural graphite, artificial graphite, and amorphous coated natural graphite are preferably used, and amorphous coated graphite is particularly preferably used. The form of the negative electrode active material is not particularly limited but, typically, is a particulate or powder form. The average particle size of the negative electrode active material in a particulate form is 50 µm or less (typically, 20 µm or less; for example, 1 µm to 20 µm and preferably 5 µm to 15 µm) when measured based on a laser diffraction and scattering method. As a result, a negative electrode active material layer having the void volume disclosed herein can be suitably formed.

In addition to the negative electrode active material, the negative electrode active material layer further contains one material or two or more materials which can be used as components of a negative electrode active material layer in a general nonaqueous electrolyte secondary battery. Examples of the material include a binder and various additives. Preferable examples of the binder include styrene-butadiene rubber (SBR), polyvinylidene fluoride (PVdF), and polytetrafluoroethylene (PTFE). In addition, the negative electrode active material layer may further contain various additives (for example, a thickener, a dispersant, and a conductive material). As the thickener, for example, carboxymethyl cellulose (CMC) or methyl cellulose (MC) is preferably used.

It is preferable that a ratio of the mass of the negative electrode active material to the total mass of the negative electrode active material layer is suitably about 50 mass % or more and is usually preferably about 90 mass % to 99 mass % (typically, 95 mass % to 99 mass %). As a result, high energy density can be realized. When the binder is used, a ratio of the mass of the binder to the total mass of the negative electrode active material layer is, for example, about 1 mass % to 10 mass % and is usually preferably about 1 mass % to 5 mass %. As a result, the mechanical strength (shape retaining ability) of the negative electrode active material layer can be suitably secured, and superior durability can be realized. When the thickener is used, a ratio of the mass of the thickener to the total mass of the negative electrode active material layer is, for example, about 1 mass % to 10 mass % and is usually preferably about 1 mass % to 5 mass %.

In the technique disclosed herein, a void volume $\beta$ ($cm^3$/Ah) of the negative electrode active material layer per battery capacity is 2.17 or more. For example, the void volume $\beta$ may be 2.34 or more and may be 2.50 or more. In addition, the void volume $\beta$ ($cm^3$/Ah) of the negative electrode active material layer per battery capacity is 3.27 or less. For example, the void volume $\beta$ may be 2.85 or less or may be 2.68 or less. By satisfying $2.17 \leq \beta$, the diffusion path of charge carriers in the negative electrode active material layer can be secured, and the charge transfer resistance can be effectively reduced. In addition, by satisfying $\beta \leq 3.27$, the amount of the nonaqueous electrolytic solution in the negative electrode active material layer can be suitably maintained even when high-rate charging and discharging is repeated at 2 C (particularly, 5 C) or higher. Further, suitable electron conductivity can be imparted to the negative electrode active material layer. As a result, superior high rate characteristics and high-rate cycle characteristics can be realized.

As long as the void volume $\beta$ is satisfied, the density of the negative electrode active material layer is not particularly limited but is usually 0.5 $g/cm^3$ or more (typically 0.9 $g/cm^3$ or more; for example, 1 $g/cm^3$ or more) and 2 $g/cm^3$ or less (typically 1.7 $g/cm^3$ or less; for example, 1.5 $g/cm^3$ or less and preferably 1.3 $g/cm^3$ or less). By satisfying the above-range, high battery capacity can be secured, and an appropriate amount of voids can be secured in the positive electrode active material layer. Therefore, high energy density and high input and output densities can be simultaneously realized at a high level.

In addition, the average thickness of the negative electrode active material layer per single surface is not particularly limited, but is usually 40 µm or more (typically, 50 µm or more, preferably 60 µm or more, and more preferably 70 µm or more) and 100 µm or less (typically, 90 µm or less, preferably 85 µm or less, and more preferably 80 µm or less; for example, 75 µm or less). By forming the negative electrode active material layer to be relatively thicker, the energy density of the battery can be improved. In general, when the thickness of a negative electrode active material layer is large, the diffusion distance of charge carriers increases, and the internal resistance (particularly, the resistance during high-rate charging and discharging) of the negative electrode active material layer increases in contrast. However, according to the technique disclosed herein, the diffusion path of charge carriers in the negative electrode active material layer can be accurately secured. Therefore, high energy density and high input and output densities can be simultaneously realized at a high level. That is, examples of preferable targets to which the technique disclosed here is applicable include a nonaqueous electrolyte secondary battery in which the thickness of a negative electrode active material layer is large (for example, 70 µm or more, specifically, 70 µm to 90 µm).

In a preferred embodiment, a ratio $\alpha/\beta$ of the void volume $\alpha$ ($cm^3$/Ah) of the positive electrode active material layer per battery capacity to the void volume $\beta$ ($cm^3$/Ah) of the negative electrode active material layer per battery capacity is 0.35 or more (preferably 0.48 or more and more preferably 0.52 or more) and 0.88 or less (preferably 0.73 or less and more preferably 0.71 or less). When the ratio $\alpha/\beta$ is significantly less than 0.35, the diffusion of charge carriers in the positive electrode active material layer is delayed, for example, during high-rate discharging, which may decrease the reaction rate. On the other hand, when the ratio $\alpha/\beta$ is significantly more than 0.88, the amount of the electrolytic solution maintained in the positive electrode active material layer is excessively large, and the amount of the electrolytic solution in the negative electrode active material layer is small during high-rate discharging, which may increase the internal resistance. By controlling the ratio $\alpha/\beta$ to be within the above-described range, the internal resistance can be further reduced during high-rate charging and discharging, and particularly superior high rate characteristics (for example, high-rate cycle characteristics) can be realized.

<Nonaqueous Electrolytic Solution>

The nonaqueous electrolytic solution of the nonaqueous electrolyte secondary battery disclosed herein is liquid at normal temperature (for example, 25° C.) and is preferably constantly liquid in an operating temperature range (for example, −20° C. to 60° C.). As the nonaqueous electrolytic solution, typically, a solution in which a supporting electrolyte (for example, a lithium salt, a sodium salt, or a magnesium salt; in a lithium ion secondary battery, a lithium salt) is dissolved or dispersed in a nonaqueous solvent can be used. As the nonaqueous solvent, various organic solvents which can be used in a general nonaqueous electrolyte secondary battery, for example, carbonates, ethers, esters, nitriles, sulfones, and lactones can be considered. Specific examples of the nonaqueous solvent include ethylene carbonate (EC), propylene carbonate (PC), diethyl carbonate (DEC), dimethyl carbonate (DMC), and ethyl methyl carbonate (EMC). Among these nonaqueous solvents, one kind can be used alone, or two or more kinds can be appropriately used in combination.

The supporting electrolyte can be appropriately selected from among those which can be used in a general nonaqueous electrolyte secondary battery as long as it contains charge carriers (for example, lithium ions, sodium ions, or magnesium ions; in a lithium ion secondary battery, lithium ions). Specific examples of the supporting electrolyte include lithium salts such as $LiPF_6$, $LiBF_4$, $LiClO_4$, $LiAsF_6$, $Li(CF_3SO_2)_2N$, and $LiCF_3SO_3$. Among these supporting electrolytes, one kind can be used alone, or two or more kinds can be used in combination. As the supporting electrolyte, for example, $LiPF_6$ is particularly preferably used. In addition, the density of the supporting electrolyte is preferably 0.7 mol/L to 1.3 mol/L with respect to the total amount of the nonaqueous electrolytic solution.

In addition, optionally, the nonaqueous electrolytic solution may further contain various additives within a range where the effects of the invention does not significantly deteriorate. Examples of the additives include a film forming agent such as lithium bis(oxalato)borate (LiBOB), vinylene carbonate (VC), vinyl ethylene carbonate (VEC), or fluoroethylene carbonate (FEC); a compound which may produce gas during overcharge, such as biphenyl (BP) or cyclohexylbenzene (CHB); a surfactant; a dispersant; and a thickener.

<Embodiment>

Although it is not intended to limit the invention, a nonaqueous electrolyte secondary battery according to an embodiment of the invention in which a flat wound electrode body and a nonaqueous electrolytic solution are accommodated in a flat rectangular battery case will be described as an example. In addition, in the following drawings, parts or portions having the same function are represented by the same reference numerals, and the repeated description will not be made or will be simplified. In each drawing, a dimensional relationship (for example, lengths, width, or thickness) does not reflect the actual dimensional relationship.

Figure 1:
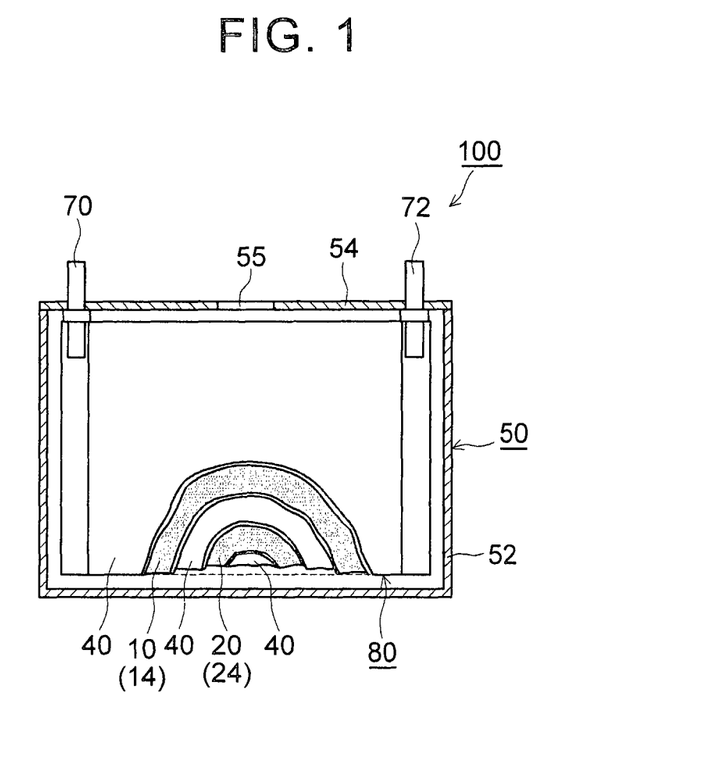
FIG. 1 is a vertical cross-sectional view schematically showing a nonaqueous electrolyte secondary battery according to an embodiment of the invention.

FIG. 1 is a vertical cross-sectional view schematically showing a cross-sectional structure of a nonaqueous electrolyte secondary battery 100. In this nonaqueous electrolyte secondary battery 100, an electrode body (wound electrode body) 80 and a nonaqueous electrolytic solution (not shown) are accommodated in a flat box-shaped battery case 50. The electrode body 80 has a configuration in which a positive electrode sheet 10 and a negative electrode sheet 20 are wounded flat with a separator sheet 40 interposed therebetween. In the nonaqueous electrolyte secondary battery 100 including the wound electrode body, when high-rate charging and discharging is repeated, the supply of charge carriers is insufficient, for example, in the center of the wound electrode body 80 in a winding axial direction, which may increase the resistance. Therefore, the invention is suitably applicable to the nonaqueous electrolyte secondary battery 100.

The battery case 50 includes: a flat rectangular (box shape) battery case body 52 having an open upper end; and a lid 54 that covers the opening. As the material of the battery case 50, a relatively light metal (for example, aluminum or an aluminum alloy) can be preferably adopted. In a top surface (that is, the lid 54) of the battery case 50, a positive electrode terminal 70 for external connection and a negative electrode terminal 72 are provided. The positive electrode terminal 70 is electrically connected to the positive electrode of the wound electrode body 80. The negative electrode terminal 72 is electrically connected to the negative electrode of the wound electrode body 80. The lid 54 further includes a safety valve 55 for discharging gas, produced from the inside of the battery case 50, to the outside of the battery case 50.

The flat wound electrode body 80 and the nonaqueous electrolytic solution (not shown) are accommodated in the battery case 50. The wound electrode body 80 includes a positive electrode (positive electrode sheet) 10 having a long sheet shape and a negative electrode (negative electrode sheet) 20 having a long sheet shape. The positive electrode sheet 10 includes a long positive electrode current collector; and a positive electrode active material layer 14 that is formed on at least one surface (typically, on both surfaces) in a longitudinal direction. The negative electrode sheet 20 includes a long negative electrode current collector; and a negative electrode active material layer 24 that is formed on at least one surface (typically, on both surfaces) in a longitudinal direction. In addition, two separators (separator sheets) 40 having a long sheet shape are arranged between the positive electrode active material layer 14 and the negative electrode active material layer 24 as an insulating layer for preventing direct contact therebetween.

As the separator sheet 40, a porous sheet formed of a resin such as polyethylene (PE), polypropylene (PP), polyester, cellulose, or polyimide; or non-woven fabric can be used. The air permeability (Gurley value) of the separator sheet 40 is usually preferably 100 sec/100 mL to 400 sec/100 mL when measured using a method defined in JIS P8117 (2009). As a result, the movement of charge carriers in the separator can be smoothly performed, and, for example, even when high-rate charging and discharging is repeated, an increase in resistance can be prevented. The separator sheet 40 may have a single-layer structure or a structure in which two or more porous sheets having different materials and properties (for example, thickness or porosity) are laminated. In addition, for example, in order to prevent internal short-circuit, a porous heat-resistant layer containing inorganic compound particles (inorganic filler) may be formed on a single surface or both surfaces of the above-described porous resin sheet.

A winding core portion is formed in the center of the wound electrode body 80 in a width direction which is defined as a direction moving from one end portion to another end portion in the winding axial direction, the winding core portion having a configuration in which the positive electrode active material layer 14, which is formed on the surface of the positive electrode current collector, and the negative electrode active material layer 24, which is formed on the negative electrode current collector, overlap each other to be densely laminated. In addition, at opposite end portions of the wound electrode body 80 in the winding axial direction, a positive electrode active material layer non-forming portion of the positive electrode sheet 10 and a negative electrode active material layer non-forming portion of the negative electrode sheet 20 protrude from the winding core portion to the outside, respectively. A positive electrode current collector plate is attached to the protrusion on the positive electrode side (that is, the positive electrode active material layer non-forming portion). A negative electrode current collector plate is attached to the protrusion on the negative electrode side (that is, the negative electrode active material layer non-forming portion). Both the positive and negative electrode current collector plates are electrically connected to the positive electrode terminal 70 and the negative electrode terminal 72 described above, respectively.

<Use of Nonaqueous Electrolyte Secondary Battery>

The nonaqueous electrolyte secondary battery disclosed herein has characteristics in that the initial resistance is low, and the durability (high-rate cycle durability) against high-rate charging and discharging is superior. For example, high energy density and high-rate cycle durability can be simultaneously realized at a high level. Accordingly, examples of preferable targets to which the technique disclosed here is applicable include a high-capacity nonaqueous electrolyte secondary battery having a theoretical capacity of 4 Ah or higher (for example, 10 Ah or higher, particularly, 20 Ah or higher) and, for example, 100 Ah or lower; and a nonaqueous electrolyte secondary battery which can be used in a charging-discharging cycle in which high-rate charging and discharging is repeated at 5 C or higher (for example 5 C to 50 C), 10 C or higher, and particularly 20 C or higher (for example, 20 C to 50 C). Due to the above-described characteristics, the battery disclosed herein can be suitably used as a driving power supply for a vehicle. The type of the vehicle is not particularly limited, and examples thereof include a plug-in hybrid vehicle (PHV), a hybrid vehicle (HV), an electric vehicle (EV), an electric truck, a motorized bicycle, an electric assist bicycle, an electric wheelchair, and an electric railway. Such nonaqueous electrolyte secondary battery can be used in the form of a battery pack in which plural batteries are integrally confined and are connected in series and/or in parallel. In this case, according to the finding of the present inventors, the void volume of the active material layer does not significantly change at such a confining pressure.

Hereinafter, several examples relating to the invention will be described, but the examples are not intended to limit the invention.

<Preparation of Positive Electrodes (C1 to C10)>

$LiNi_{0.33}Mn_{0.33}Co_{0.33}O_2$ (LNCM) as a positive electrode active material; acetylene black (AB) as a conductive material; and polyvinylidene fluoride (PVdF) as a binder were put into a kneading machine such that a mass ratio (LNCM: AB:PVdF) of the materials was 90:8:2. The mixture was kneaded while adjusting the viscosity with N-methylpyrrolidone (NMP). As a result, a positive electrode active material slurry was prepared. Both surfaces of aluminum foil (positive electrode current collector) having a thickness of 15 μm was coated with the slurry, was dried, and then was pressed. As a result, positive electrode sheets (C1 to C10) which include positive electrode active material layers having properties as shown in Table 1 were prepared.

TABLE 1

Properties of Positive Electrode Material Layer per Single Surface

| | Positive Electrode Sheet | | | | | | | | | |
|---|---|---|---|---|---|---|---|---|---|---|
| | C1 | C2 | C3 | C4 | C5 | C6 | C7 | C8 | C9 | C10 |
| Average Thickness (μm) | 50 | 52 | 54 | 58 | 60 | 62 | 66 | 70 | 74 | 78 |
| Density (g/cm³) | 3.14 | 2.97 | 2.82 | 2.56 | 2.44 | 2.34 | 2.16 | 2.00 | 1.86 | |
| Void Volume (cm³) | 1.63 | 2.22 | 2.81 | 3.99 | 4.59 | 5.18 | 6.38 | 7.59 | 8.81 | 1.75 |
| Void Volume α (cm³/Ah) per Battery Capacity | 0.41 | 0.56 | 0.70 | 1.00 | 1.15 | 1.30 | 1.60 | 1.90 | 2.20 | 10.03 2.51 |
| Average Pore Size (μm) | 0.11 | 0.18 | 0.20 | 0.25 | 0.27 | 0.28 | 0.32 | 0.43 | 0.54 | 0.63 |

<Preparation of Negative Electrodes (A1 to A11)>

Amorphous coated natural graphite (C) as a negative electrode active material; styrene-butadiene rubber (SBR) as a binder; and carboxymethyl cellulose (CMC) as a thickener were put into a kneading machine such that a mass ratio (C:SBR:CMC) of the materials was 98:1:1. The mixture was kneaded while adjusting the viscosity with ion exchange water. As a result, a negative electrode active material slurry was prepared. Both surfaces of long copper foil (negative electrode current collector) having a thickness of 10 μm was coated with the slurry, was dried, and then was pressed. As a result, negative electrode sheets (A1 to A11) which include negative electrode active material layers having properties as shown in Table 2 were prepared.

TABLE 2

Properties of Negative Electrode Material Layer per Single Surface

| | Negative Electrode Sheet | | | | | | | | | | |
|---|---|---|---|---|---|---|---|---|---|---|---|
| | A1 | A2 | A3 | A4 | A5 | A6 | A7 | A8 | A9 | A10 | A11 |
| Average Thickness (μm) | 55 | 60 | 65 | 70 | 72 | 74 | 76 | 78 | 80 | 85 | 90 |
| Density (g/cm³) | 1.69 | 1.52 | 1.38 | 1.27 | 1.23 | 1.19 | 1.15 | 1.12 | 1.09 | 1.01 | 0.95 |
| Void Volume (cm³) | 3.30 | 4.89 | 6.50 | 8.12 | 8.70 | 9.35 | 10.00 | 10.65 | 11.40 | 13.06 | 14.79 |

TABLE 2-continued

Properties of Negative Electrode Material Layer per Single Surface

| | Negative Electrode Sheet | | | | | | | | | | |
|---|---|---|---|---|---|---|---|---|---|---|---|
| | A1 | A2 | A3 | A4 | A5 | A6 | A7 | A8 | A9 | A10 | A11 |
| Void Volume β (cm³/Ah) per Battery Capacity | 0.82 | 1.22 | 1.62 | 2.03 | 2.17 | 2.34 | 2.50 | 2.66 | 2.85 | 3.27 | 3.70 |

<Construction of Nonaqueous Electrolyte Secondary Battery>

One positive electrode sheet selected from among the above-prepared positive electrodes (C1 to C10) and one negative electrode sheet selected from among the above-prepared negative electrodes (A1 to A11) were laminated and wounded with two separator sheets interposed therebetween. As a result, a wound electrode body is prepared. As the separator sheet, a porous film (Gurley value: 360 sec/100 ml) having a three-layer structure of polyethylene/polypropyelne/polyethylene was used. Next, the above-prepared wound electrode body and a nonaqueous electrolytic solution were accommodated in an aluminum square battery case, and an opening of the battery case was sealed. As the nonaqueous electrolytic solution, a solution was used in which $LiPF_6$ as a supporting electrolyte was dissolved in a mixed solvent at a concentration of 1.1 mol/L, the mixed solvent containing ethylene carbonate (EC), dimethyl carbonate (DMC), and ethyl methyl carbonate (EMC) at a volume ratio (EC:DMC:EMC) of 30:40:30. In this way, 110 types of nonaqueous electrolyte secondary batteries (theoretical capacity: 4 Ah) in total were constructed in which properties of the positive electrode active material layers and/or properties of the negative electrode active material layer were different. The ratios α/β of the void volume α to the void volume β in the constructed batteries are shown in Table 3.

<Conditioning>

The following charging-discharging operations (I) and (II) were repeatedly performed on 110 types of the constructed batteries in 3 cycles at a temperature of 25° C. to perform a conditioning treatment.

(I) The batteries were charged at a constant current (CC) at a rate of ⅓ C until a positive electrode potential reached 4.2 V, and then the operation was stopped for 10 minutes.

(II) The batteries were discharged at a constant current (CC) at a rate of ⅓ C until a positive electrode potential reached 3.0 V, and then the operation was stopped for 10 minutes.

<Initial Resistance>

The SOC of the batteries after the conditioning treatment was adjusted to 60% at a temperature of 25° C. Each of the batteries was installed in a thermostatic chamber controlled to −30° C., and the AC impedance thereof was measured. The diameter of an arc portion in the obtained Cole-Cole plot was calculated as a resistance (Ω). The results are shown in Table 4.

TABLE 3

Ratio α/β of α to β

| | Negative Electrode A/Positive Electrode C | | | | | | | | | |
|---|---|---|---|---|---|---|---|---|---|---|
| | C1 | C2 | C3 | C4 | C5 | C6 | C7 | C8 | C9 | C10 |
| A1 | 0.50 | 0.67 | 0.85 | 1.21 | 1.39 | 1.57 | 1.94 | 2.30 | 2.67 | 3.04 |
| A2 | 0.33 | 0.45 | 0.57 | 0.82 | 0.94 | 1.06 | 1.31 | 1.55 | 1.80 | 2.05 |
| A3 | 0.25 | 0.34 | 0.43 | 0.61 | 0.71 | 0.80 | 0.98 | 1.17 | 1.36 | 1.54 |
| A4 | 0.20 | 0.27 | 0.35 | 0.49 | 0.57 | 0.64 | 0.79 | 0.94 | 1.09 | 1.24 |
| A5 | 0.19 | 0.26 | 0.32 | 0.46 | 0.53 | 0.60 | 0.73 | 0.87 | 1.01 | 1.15 |
| A6 | 0.17 | 0.24 | 0.30 | 0.43 | 0.49 | 0.55 | 0.68 | 0.81 | 0.94 | 1.07 |
| A7 | 0.16 | 0.22 | 0.28 | 0.40 | 0.46 | 0.52 | 0.64 | 0.76 | 0.88 | 1.00 |
| A8 | 0.15 | 0.21 | 0.26 | 0.37 | 0.43 | 0.49 | 0.60 | 0.71 | 0.83 | 0.94 |
| A9 | 0.14 | 0.19 | 0.25 | 0.35 | 0.40 | 0.45 | 0.56 | 0.67 | 0.77 | 0.88 |
| A10 | 0.13 | 0.17 | 0.22 | 0.31 | 0.35 | 0.40 | 0.49 | 0.58 | 0.67 | 0.77 |
| A11 | 0.11 | 0.15 | 0.19 | 0.27 | 0.31 | 0.35 | 0.43 | 0.51 | 0.60 | 0.68 |

TABLE 4

Measurement Results of Initial Resistance (Ω)

Negative Electrode A/Positive Electrode C

|     | C1   | C2   | C3   | C4   | C5   | C6   | C7   | C8   | C9   | C10  |
|-----|------|------|------|------|------|------|------|------|------|------|
| A1  | 1.19 | 1.23 | 1.24 | 1.23 | 1.21 | 1.22 | 1.23 | 1.24 | 1.31 | 2.21 |
| A2  | 1.21 | 1.23 | 1.22 | 1.24 | 1.24 | 1.25 | 1.24 | 1.27 | 1.33 | 2.23 |
| A3  | 1.22 | 1.21 | 1.22 | 1.23 | 1.24 | 1.27 | 1.22 | 1.26 | 1.32 | 2.22 |
| A4  | 1.21 | 1.22 | 1.24 | 1.23 | 1.23 | 1.24 | 1.24 | 1.27 | 1.35 | 2.26 |
| A5  | 1.22 | 1.23 | 1.25 | 1.24 | 1.22 | 1.26 | 1.25 | 1.28 | 1.37 | 2.28 |
| A6  | 1.22 | 1.23 | 1.24 | 1.23 | 1.22 | 1.26 | 1.24 | 1.29 | 1.36 | 2.30 |
| A7  | 1.24 | 1.25 | 1.25 | 1.24 | 1.25 | 1.25 | 1.23 | 1.27 | 1.39 | 2.26 |
| A8  | 1.23 | 1.24 | 1.23 | 1.25 | 1.24 | 1.26 | 1.26 | 1.26 | 1.37 | 2.28 |
| A9  | 1.24 | 1.23 | 1.25 | 1.23 | 1.25 | 1.25 | 1.28 | 1.29 | 1.38 | 2.34 |
| A10 | 1.26 | 1.27 | 1.28 | 1.27 | 1.28 | 1.29 | 1.30 | 1.33 | 1.38 | 2.59 |
| A11 | 1.62 | 1.64 | 1.63 | 1.68 | 1.70 | 1.67 | 1.69 | 1.70 | 1.72 | 3.42 |

<High-Rate Cycle Test>

The SOC of each of the batteries after the initial resistance measurement was adjusted to 60% at a temperature of 25° C., and then the following charging-discharging operations (III) and (IV) were repeatedly performed thereon in 1200 cycles to evaluate high-rate cycle characteristics.

(III) The batteries were discharged at a constant current (CC) of 75 A (18.75 C) for 40 seconds, and the operation was stopped for 5 seconds.

(IV) The batteries were charged at a constant current (CC) of 10 A for 300 seconds, and the operation was stopped for 5 seconds.

After completion of the test, the resistance after the high-rate cycle test was measured in the same manner as that of the initial resistance. An increase (%) in reaction resistance was calculated by dividing the reaction resistance after the high-rate cycle test by the initial reaction resistance and multiplying the obtained value by 100. The results are shown in Table 5.

TABLE 5

Measurement Results of High-Rate Cycle Characteristics (Increase (%) in Resistance))

Negative Electrode A/Positive Electrode C

|     | C1    | C2    | C3    | C4    | C5    | C6    | C7    | C8    | C9    | C10   |
|-----|-------|-------|-------|-------|-------|-------|-------|-------|-------|-------|
| A1  | 189.4 | 178.7 | 175.5 | 173.1 | 173.0 | 172.8 | 168.4 | 166.2 | 163.1 | 245.5 |
| A2  | 184.4 | 176.2 | 169.4 | 160.8 | 162.9 | 158.1 | 158.9 | 154.3 | 152.4 | 234.8 |
| A3  | 184.2 | 175.5 | 165.7 | 155.3 | 154.5 | 153.8 | 152.9 | 149.5 | 148.7 | 235.1 |
| A4  | 183.2 | 173.9 | 158.9 | 149.7 | 148.6 | 147.8 | 145.6 | 143.9 | 137.8 | 232.6 |
| A5  | 182.9 | 172.2 | 154.6 | 107.6 | 104.9 | 104.2 | 105.8 | 108.3 | 132.3 | 225.9 |
| A6  | 182.4 | 172.1 | 153.2 | 105.9 | 105.9 | 103.4 | 103.2 | 107.1 | 130.8 | 234.2 |
| A7  | 183.4 | 170.0 | 155.3 | 105.8 | 106.9 | 104.7 | 104.3 | 107.5 | 108.1 | 238.9 |
| A8  | 184.7 | 171.6 | 153.4 | 107.5 | 107.2 | 106.9 | 104.1 | 104.5 | 107.8 | 243.1 |
| A9  | 182.2 | 170.3 | 153.2 | 108.4 | 107.4 | 108.4 | 104.6 | 103.7 | 108.4 | 238.9 |
| A10 | 182.6 | 168.9 | 156.2 | 122.9 | 109.6 | 108.3 | 105.7 | 104.8 | 104.2 | 233.4 |
| A11 | 239.8 | 235.4 | 228.6 | 235.5 | 238.3 | 228.9 | 235.4 | 226.5 | 224.1 | 298.8 |

As clearly seen from Tables 4 and 5, in the nonaqueous electrolyte secondary batteries in which the void volume α (cm³/Ah) of the positive electrode active material layer per battery capacity and the void volume β (cm³/Ah) of the negative electrode active material layer per battery capacity satisfied the following conditions (1) to (3), the initial resistance was low, and an increase in resistance after the high-rate cycle test was suppressed (for example, an increase in resistance was suppressed to be 125% or less).

$$1.00 \leq \alpha \leq 2.20 \qquad (1)$$

$$2.17 \leq \beta \leq 3.27 \qquad (2)$$

$$\alpha < \beta \qquad (3)$$

In particular, in the nonaqueous electrolyte secondary batteries satisfying the following conditions (1') to (3), the initial resistance was low, and an increase in resistance after the high-rate cycle test was significantly suppressed (for example, an increase in resistance was suppressed to be 110% or less).

$$1.15 \leq \alpha \leq 2.20 \qquad (1')$$

$$2.17 \leq \beta \leq 3.27 \qquad (2)$$

$$\alpha < \beta \qquad (3)$$

It can be seen from the above result that, according to the technique disclosed herein, a nonaqueous electrolyte secondary battery having a low initial resistance and superior durability against high-rate discharging can be realized.

Figure 2:
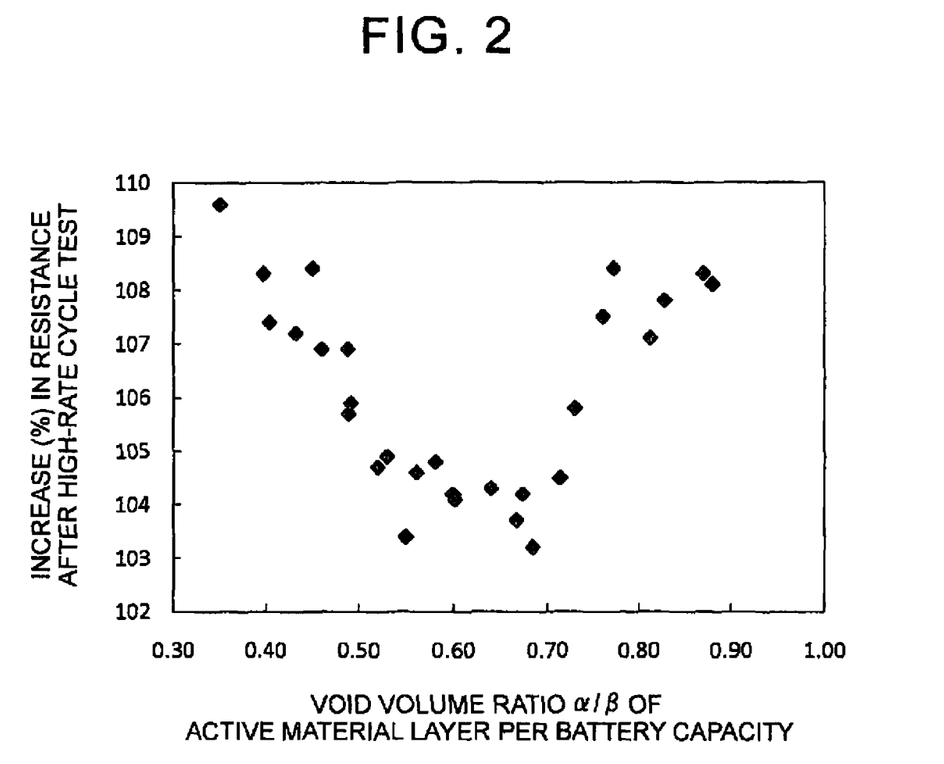
FIG. 2 is a graph showing a relationship between a void volume ratio α/β of an active material layer per battery capacity and an increase (%) in resistance after a high-rate cycle test.

FIG. 2 shows a relationship between a void volume ratio α/β of an active material layer per battery capacity and an increase (%) in resistance after a high-rate cycle test in examples in which the ratio α/β of the void volume α to the void volume β satisfied the following condition (4) in addition to the above-described conditions (1') to (3).

$$0.35 \leq \alpha/\beta \leq 0.88 \qquad (4)$$

It can be clearly seen from Table 5 and FIG. 2 that, in the examples in which the ratio α/β further satisfied 0.52≤α/β≤0.71 in addition to the above-described conditions (1) to (3), an increase in resistance after the high-rate cycle test was further suppressed at a higher level. Specifically, an increase in resistance after the high-rate cycle test was suppressed to be 105% or less. These results show the technical significance of the invention.

The embodiments and the examples described above are merely examples of the invention. The invention disclosed herein includes various modifications and alternations of the above-described specific examples.

What is claimed is:

1. A nonaqueous electrolyte secondary battery comprising:
    a positive electrode that includes a positive electrode active material layer;
    a negative electrode that includes a negative electrode active material layer; and
    a nonaqueous electrolytic solution, wherein
    when a void volume of the positive electrode active material layer per battery capacity is represented by $\alpha$ cm$^3$/Ah, and when a void volume of the negative electrode active material layer per battery capacity is represented by $\beta$ cm$^3$/Ah, following conditions are satisfied:

$1.00 \leq \alpha \leq 2.20$;  (1)

$2.17 \leq \beta \leq 3.27$; and  (2)

$\alpha < \beta$.  (3)

2. The nonaqueous electrolyte secondary battery according to claim 1, wherein
    the void volume $\alpha$ is 1.15 or more.

3. The nonaqueous electrolyte secondary battery according to claim 2, wherein
    the void volume $\alpha$ is 1.30 or more.

4. The nonaqueous electrolyte secondary battery according to claim 1, wherein
    a ratio $\alpha/\beta$ of the void volume $\alpha$ to the void volume $\beta$ is at least 0.35 and at most 0.88.

5. The nonaqueous electrolyte secondary battery according to claim 4, wherein
    the ratio $\alpha/\beta$ of the void volume $\alpha$ to the void volume $\beta$ is at least 0.52 and at most 0.71.

6. The nonaqueous electrolyte secondary battery according to claim 1, wherein
    an average pore size of the positive electrode active material layer is 0.25 μm to 0.55 μm.

* * * * *